J. V. M. RISBERG.
FLOAT VALVE FOR CENTRIFUGAL LIQUID SEPARATORS.
APPLICATION FILED DEC. 23, 1911.

1,032,704.  Patented July 16, 1912.

Witnesses:
Henry C. Thieme.
F. George Barry.

Inventor:
Johannes V. M. Risberg
by his attorneys
Brown & Seward

UNITED STATES PATENT OFFICE.

JOHANNES VALDEMAR MÅRTEN RISBERG, OF FRIDHEM, SÖDERTELJE, SWEDEN, ASSIGNOR TO AKTIEBOLAGET BALTIC, OF SÖDERTELJE, SWEDEN, A CORPORATION OF SWEDEN.

FLOAT-VALVE FOR CENTRIFUGAL LIQUID-SEPARATORS.

1,032,704.     Specification of Letters Patent.     Patented July 16, 1912.

Application filed December 23, 1911. Serial No. 667,513.

*To all whom it may concern:*

Be it known that I, JOHANNES VALDEMAR MÅRTEN RISBERG, a subject of the King of Sweden, and resident of Fridhem, Södertelje, in the Kingdom of Sweden, have invented certain new and useful Improvements in Float-Valves for Centrifugal Liquid-Separators, of which the following is a specification, reference being had therein to the accompanying drawing.

In centrifugal liquid separators a controlling device is used, as well known, for rendering practically constant the supply of the milk to the separating drum, the said device consisting of a cup and a float located in the same, which closes to a greater or less extent the outlet opening which is provided in the milk bowl, located above the said cup, so that the milk in the cup is kept at a constant level. Hitherto the said float has consisted of a hollow hermetically sealed body, generally formed of two bowls, connected at their edges by soldering.

This invention relates to a float of a simplified construction, chiefly adapted to separators of the smaller size, in which the simplest possible construction and the smallest expenses for the manufacture are aimed at.

Figure 1:
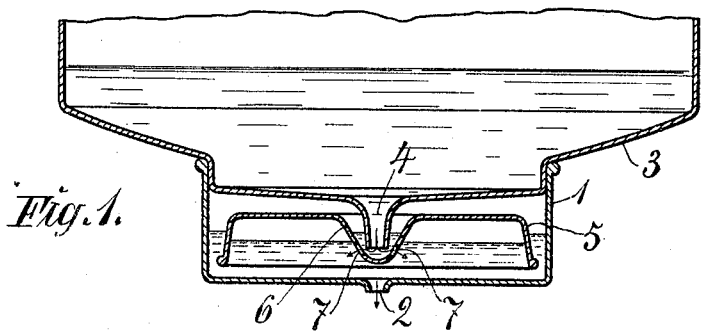
Figure 2:
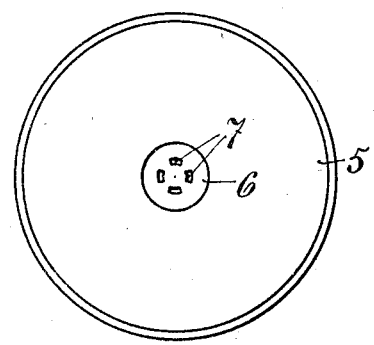
Figure 3:
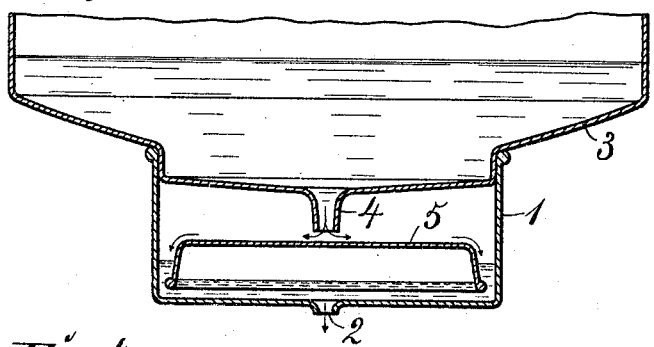
Figure 4:
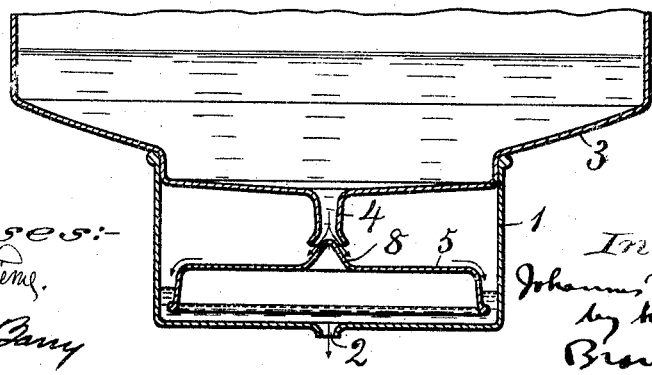

Figure 1 in the accompanying drawing is a vertical section of a float valve arranged in accordance with this invention. Fig. 2 is a plan view of the float. Figs. 3 and 4 are vertical sections of two other forms of the float valve.

1 is the cup provided with the outlet opening 2 leading to the separator drum, and 3 is the bottom part of the milk bowl provided with the spout 4.

5 is the float, consisting according to this invention of a bell shaped body or a bowl, turned upside down. The central part 6 of the said bowl is forced down forming a funnel-shaped recess, into which the spout 4 extends. In the form of execution shown in the drawing the said central part 6 is provided with openings 7, through which the milk, coming from the spout 4, passes into the chamber below the float, as indicated by the arrows, shown in Fig. 1. From the said chamber the milk passes into the centrifugal drum through the outlet opening 2.

The float valve acts in the following manner. After the removing of a plug or the like, which before the starting of the separator closes the spout 4, the milk runs down into the cup 1, and, owing to the fact that the spout 4 is wider than the outlet opening 2, the milk gathers gradually in the cup, and, when the level of the milk has risen to the upper edges of the openings 7, the float 5 is raised by the air inclosed in its top part, so that the spout is shut off by the bottom of the recess 6 to such an extent, that the quantity of milk passing into the cup 1 is not greater than the quantity leaving the same through the outlet opening 2. Consequently, the milk in the cup 1 is kept at a constant level, so that the output of the separator is uniform. As well known, a bell shaped float, not guided, has the tendency of upsetting. In order to prevent the float from upsetting, the float is generally provided with a guide. As shown in Fig. 1 the upsetting of the float is prevented according to this invention by its height being so adapted, that there is only a slight play for the float between the bottom of the cup 1 and the spout 4. The said openings 7 are not necessary for the operation of the float but may be dispensed with. The milk then passes on the top side of the float and flows down the side wall of the same. The float, however, operates better when provided with the said openings.

The recess 6 may be omitted, so that the top side of the float 5 is plane, as shown in Fig. 8. A further modification consists in the conical recess 6, shown in Figs. 1 and 2 being substituted by a conical non-perforated projection 8, Fig. 4, extending into the spout 4 of the milk bowl.

In all the forms of execution the construction of the float valve is the simplest possible and the cost of manufacture reduced to a minimum, as the manufacture is confined to a single stamping operation and every soldering operation is unnecessary. The described float is more reliable and durable than floats of the older construction, owing to the fact that it can not be rendered unfit for use by leaking.

Having now described my invention, what I claim as new and desire to secure by Letters Patent is:

1. A float valve for centrifugal liquid separators consisting of a bell shaped body, adapted to coöperate with its top side with the outlet opening of the liquid receptacle.

2. A float valve for centrifugal liquid-separators consisting of a bell shaped body adapted to coöperate with its top side with the outlet opening of the liquid receptacle and of such height, that, when the body is located in its cup, there is such a slight play for the same between the bottom of the cup and the outlet opening of the liquid receptacle, that the body is unable to upset.

3. A float valve for centrifugal liquid separators consisting of a bell shaped body, in the top side of which a conical recess is provided, adapted to coöperate with the outlet spout of the liquid receptacle.

4. A float valve for centrifugal liquid separators consisting of a bell shaped body, in the top side of which a conical recess is provided, adapted to coöperate with the outlet spout of the liquid receptacle and provided with openings, leading to the chamber inside the body.

In witness whereof, I have hereunto signed my name in the presence of two subscribing witnesses.

JOHANNES VALDEMAR MÅRTEN RISBERG.

Witnesses:
ARRETO CRINE,
ROBERT APELGREN.

Copies of this patent may be obtained for five cents each, by addressing the "Commissioner of Patents, Washington, D. C."